United States Patent
Presche

(10) Patent No.: US 12,509,290 B2
(45) Date of Patent: Dec. 30, 2025

(54) DEVICE FOR PREPARING AND DISPENSING A MIXED SUBSTANCE AND METHOD FOR FILLING A DEVICE

(71) Applicant: RPC Bramlage GmbH, Lohne (DE)

(72) Inventor: Martin Presche, Dinklage (DE)

(73) Assignee: RPC Bramlage GmbH, Lohne (DE)

( * ) Notice: Subject to any disclaimer, the term of this patent is extended or adjusted under 35 U.S.C. 154(b) by 0 days.

(21) Appl. No.: 18/691,168

(22) PCT Filed: Sep. 14, 2022

(86) PCT No.: PCT/EP2022/075492
§ 371 (c)(1),
(2) Date: Mar. 12, 2024

(87) PCT Pub. No.: WO2023/041562
PCT Pub. Date: Mar. 23, 2023

(65) Prior Publication Data
US 2025/0136347 A1 May 1, 2025

(30) Foreign Application Priority Data

Sep. 14, 2021 (GB) .................................... 2113119

(51) Int. Cl.
*B65D 81/32* (2006.01)
*B65B 3/04* (2006.01)
(Continued)

(52) U.S. Cl.
CPC ............ *B65D 81/3211* (2013.01); *B65B 3/04* (2013.01); *B65D 51/002* (2013.01); *B65D 51/2864* (2013.01)

(58) Field of Classification Search
CPC ............ B65D 81/3211; B65D 51/2864; B65D 51/2807
(Continued)

(56) References Cited

U.S. PATENT DOCUMENTS 7,484,633 B1 * 2/2009 Moher ............... B65D 81/3211
215/11.1
8,672,123 B1 * 3/2014 Vallejo ..................... A61J 9/00
222/153.04
(Continued)

FOREIGN PATENT DOCUMENTS

| EP | 2 423 124 A1 | 2/2012 |
| FR | 2 290 365 A1 | 6/1976 |
| JP | 2011-016588 A | 1/2011 |

OTHER PUBLICATIONS

Notification of Transmittal of the International Search Report and the Written Opinion of the International Searching Authority with attached International Search Report and Written Opinion of the International Searching Authority in PCT/EP2022/075492, mailed Mar. 23, 2023.

*Primary Examiner* — Steven A. Reynolds
(74) *Attorney, Agent, or Firm* — Collard & Roe, P.C.

(57) ABSTRACT

A device for preparing and dispensing a mixed substance has a first container containing a first substance and a second container containing a second substance, the containers having a common central axis. The first container has a ceiling with an optional first opening, a first wall, and a first base, the second container having a second wall and a second base, the first base having an outlet formation which can be closed by a closure part. The closure part forms a lid for the second container by connection to a free edge of the second wall. The outlet formation is brought into alignment with a second opening in the closure part by rotating the first container relative to the closure part, clearing the way for the first substance into the second container. The mixed substance can be removed from the device through a third opening in the container bottom.

10 Claims, 7 Drawing Sheets

(51) Int. Cl.
*B65D 51/00* (2006.01)
*B65D 51/28* (2006.01)

(58) Field of Classification Search
USPC .................................................. 206/219, 222
See application file for complete search history.

(56) References Cited

U.S. PATENT DOCUMENTS

| | | | |
|---|---|---|---|
| 9,629,782 B2* | 4/2017 | Hayes | A61J 11/002 |
| 10,585,021 B2* | 3/2020 | Blankenstein | G01N 1/38 |
| 2008/0142030 A1 | 6/2008 | Venere et al. | |
| 2008/0314775 A1 | 12/2008 | Owoc | |
| 2011/0233118 A1* | 9/2011 | Nelson | B65D 83/0094 |
| | | | 210/236 |
| 2012/0024862 A1* | 2/2012 | Otsuka | B65D 81/3211 |
| | | | 220/502 |
| 2012/0055935 A1* | 3/2012 | Peres | B65D 81/3211 |
| | | | 220/502 |
| 2013/0037506 A1* | 2/2013 | Wahlstrom | A61J 1/2093 |
| | | | 215/6 |
| 2018/0009590 A1* | 1/2018 | Wong | B65D 1/0246 |
| 2019/0009969 A1* | 1/2019 | Kite | B65D 81/3211 |
| 2020/0391928 A1* | 12/2020 | Willis | B65D 83/764 |
| 2022/0388752 A1* | 12/2022 | Jaramillo | B65D 1/04 |

* cited by examiner

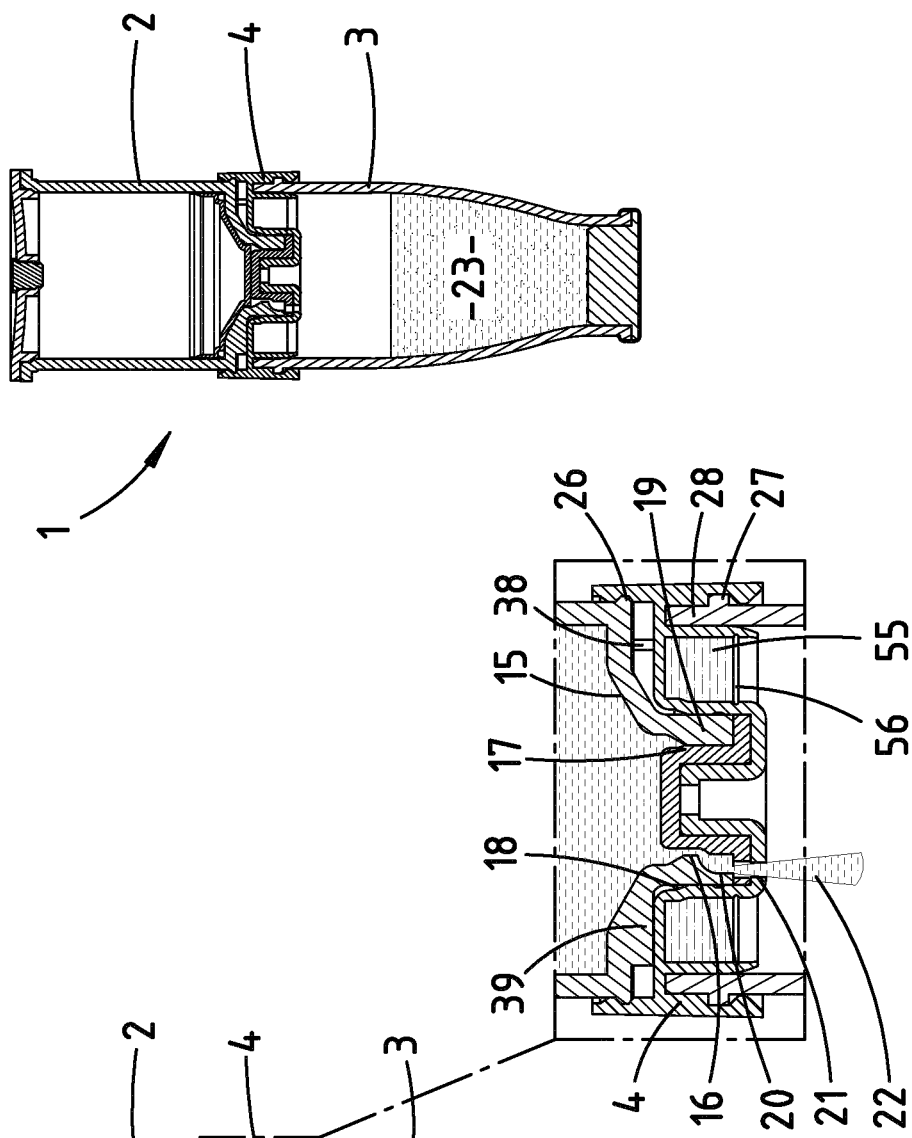

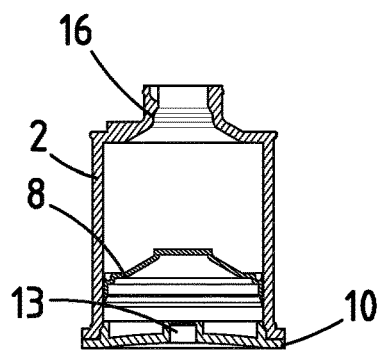
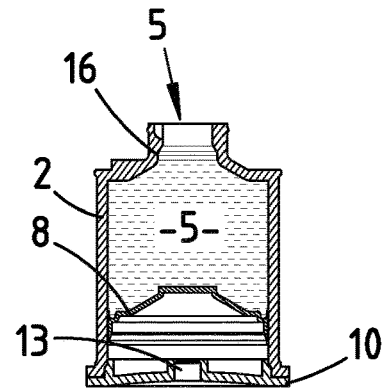
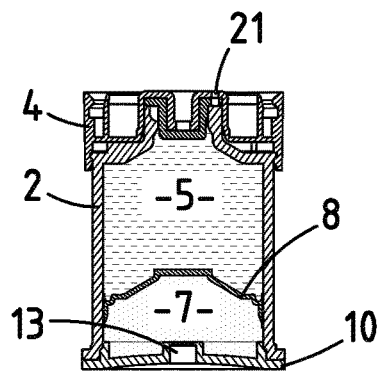
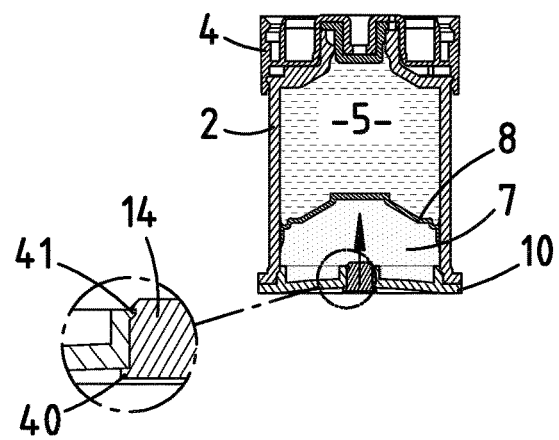
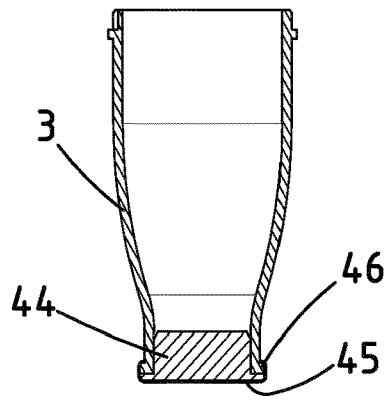
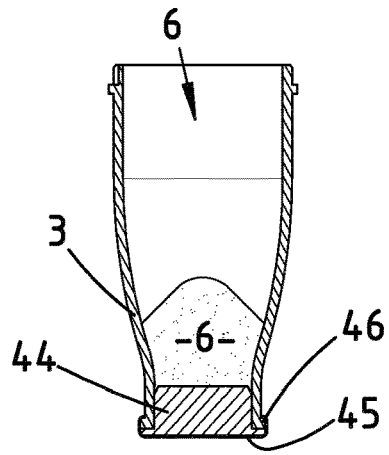

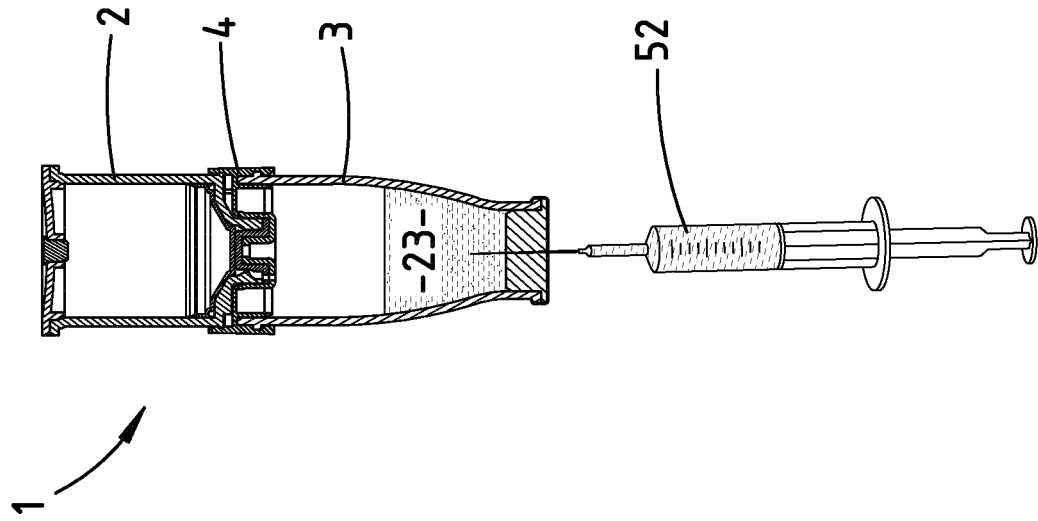
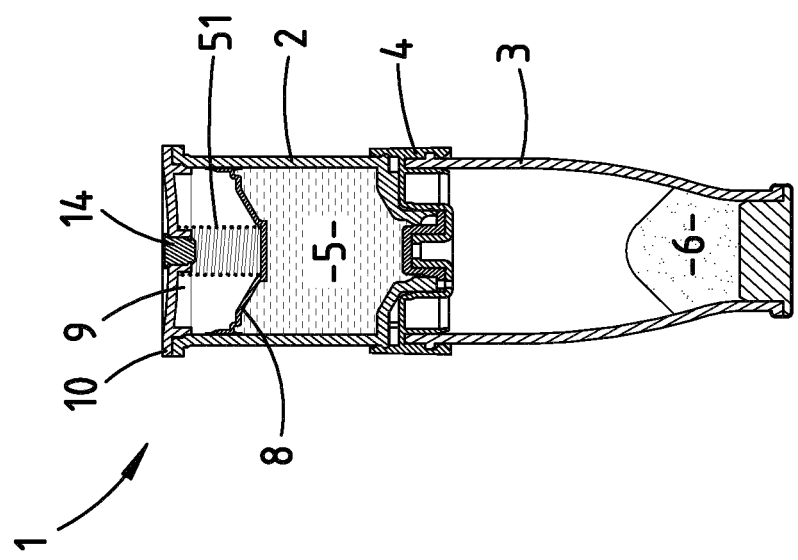

DEVICE FOR PREPARING AND DISPENSING A MIXED SUBSTANCE AND METHOD FOR FILLING A DEVICE

CROSS REFERENCE TO RELATED APPLICATIONS

This application is the National Stage of PCT/EP2022/075492 filed on Sep. 14, 2022, which claims priority under 35 U.S.C. § 119 of British Application No. 2113119.8 filed on Sep. 14, 2021, the disclosure of which is incorporated by reference. The international application under PCT article 21(2) was not published in English.

FIELD OF TECHNOLOGY

Concerning a first aspect is disclosed a device for preparing and dispensing a mixed substance starting from a first and a second substance, comprising a first container containing the first substance and a second container containing the second substance, the first and second containers having a common central axis and being arranged one behind the other along the axis, said first container having a ceiling with an optional first opening, a first wall extending substantially perpendicular to said ceiling and circumferential to said axis, and a first bottom, said second container having a second wall circumferential to said axis and a second bottom, said first bottom having an outlet formation which can be closed by a closure part, said closure part also forming a lid for said second container by connecting to a free edge of said second wall, wherein further the outlet formation is to be brought into alignment with a second opening in the closure part by rotating the first container relative to the closure part, the alignment clearing the way for the first substance into the second container, optionally assisted by gravity, for producing the mixed substance in the second container.

According to a further aspect is disclosed a device for producing and dispensing a mixed substance, comprising a first container containing a first substance and a second container containing a second substance, the first and second containers being displaceable by rotation relative to one another from a closed position, in which the first substance cannot escape from the first container, to an open position, in which the first substance can enter the second container.

According to a still further aspect is disclosed a method for filling a device for producing and dispensing a mixed substance, the device having a first container with a receiving opening and a first opening in the ceiling, and a second container, and a closure part is provided, in particular a device as indicated above.

STATE OF THE ART

From US 2008/0142030 A1 a device for the preparation and dispensing of a mixed substance is known, in which the first container has both an opening to an application end of the device and an opening for passing into the second container opposite the application end. The mixed substance must pass back through the first container to the application end to be dispensed from the second container. The first receptacle is filled only with a view to gravity-driven dispensing of a first substance.

In order for the first substance to enter the second container in the open position, the device must be held in such a way that gravity enables this entry. Since it cannot always be predetermined that the device is held by a user in such a way that gravity acts accordingly, there are limits to the use of the known device with respect to a position of use. Furthermore, this also imposes limits on the known device with regard to properties of the first substance. For example, it must not be practically viscous.

SUMMARY OF THE INVENTION

Based on the prior art described, one of the here disclosed solutions is concerned with providing a device for the production and dispensing of a mixed substance allowing for an advantageous handling. One of the here disclosed solutions is also concerned with providing a method for filling such a device.

Initially and essentially a first solution with regard to the device is provided in that the ceiling and the second bottom form opposite ends of the device, in that a third opening can be formed in the second bottom and in that the mixed substance can be removed from the device through the third opening. The mixed substance no longer needs to pass through the first container to be removed. The mixed substance can be removed directly from the second container. The third opening is not already necessary as an actual opening. It can be formed in the second bottom.

A further solution is provided in that the first substance is acted upon by a pressure element, for example via a piston accommodated in the first container, which in the given case is movably accommodated in the first container for acting upon the first substance. The pressure element may also be given, e.g. alone or in combination with the piston, by a medium under pressure.

With regard to the method for filling a device, it is provided that a first liquid substance is first introduced into the first container, in which a piston is preferably located, through the receiving opening, and then the receiving opening is closed by a closure part, with the first opening in a ceiling remaining open, and in that a pressurized medium is further introduced through the opening, in case of the piston is provided for on a side of the piston facing away from the first substance, and the opening is then closed.

Insofar as a piston is provided, it can be moved accordingly in various respects, in particular for expelling the first substance into the second container. It may be acted upon by a spring member or also, as preferred according to the disclosure given here, it may be acted upon by a pressurized gaseous medium.

In particular, a combination of the two basic concepts explained above can also be provided, in the given case also with one or more features of the respective further developments described in this respect in further detail above and below. This is particularly the case in the sense that the ceiling and the second bottom form opposite ends of the device, that a third opening can be formed in the second bottom and that the mixed substance can be removed from the device through the third opening and, furthermore, at the same time that the first substance is acted upon by a pressurized medium located in the first container, for example via a piston accommodated therein, which in the given case is movably accommodated in the first container for acting upon the first substance.

According to a further embodiment, it is preferred that the first container comprises a first bottom having an outlet formation and, further preferably, the second container comprises a closure part having a second opening. With regard to the bottom and the closure part, the parts can lie directly against each other and, for example, by rotating, the outlet formation and the second opening can be brought into a superimposed position or into a separation position, the closure position being given in the separation position.

Preferably, the first container and the second container are connected to each other via the closure part. The closure part is therefore preferably also a connecting part. Preferably, it has connecting formations that enable connection to both the first container and the second container. The closure part can form a lid of the second container.

It is further preferred that the outlet formation can be brought into alignment with the second opening by merely rotating the first container about the central axis relative to the closure member, without moving the first container in the direction of the central axis relative to the closure member. When the outlet formation is aligned with the second opening, the open position is provided. With regard to a mere rotational movement, without a movement of the first container in the direction of the central axis, in particular a connecting region of the closure part with the first container can be favourably formed. Only one snap-in receptacle is required, which runs in a plane perpendicular to the central axis. At the same time, this can prevent accidental separation of the first and second containers. The latching effect can be set so strong that it cannot be overcome with regard to a separation of the parts by hand, for example by pulling in the direction of the central axis.

Further preferably, the closure part has a first snap-in receptacle for the first container and a second snap-in receptacle for the second container, the first and second snap-in receptacles being spaced apart in the direction of the central axis. The snap-in receptacles can be of the same design. In particular, it can also be provided with regard to the second container that it can only be received in the snap-in receptacle with a movement in the direction of the central axis. Insofar as a movability of the second container is given, which is possible with respect to the closure part but is not necessary in principle, it is also preferred here that such a rotational movement with respect to the closure part can be carried out without a movement of the second container in the direction of the central axis. The engagement with the second container can also be designed to be rotationally fixed.

In summary, it is preferred that the first and second snap-in receptacles only allow the first and second containers, respectively, to rotate about the central axis, but do not allow the first or second containers to move in a longitudinal direction with respect to the central axis.

It is preferred that the ceiling has a first sealing plug. This makes it possible, in particular, for gas to be admitted through a first opening in the ceiling in order to pressurize the piston, which is preferably arranged in the first container. The first opening can then be closed with the—first—sealing plug after the e.g. gaseous medium as a possible pressure element has been introduced and the piston, as far as provided for, has been pressurized thereby.

It is further preferred that the second bottom of the second container has a second sealing plug. This provides a particularly convenient way of opening the second base. The second sealing plug can be pierced, for example by the needle of a syringe, and then the mixed substance can be removed from the second container with the inserted syringe. The second sealing plug can be connected to the second wall by a closure cap. The closure cap may assist in or provide alone retaining the second sealing plug in its sealing position.

The second sealing plug can be also alone or additionally frictionally held in the second container, as is preferably also the case with the first sealing plug.

The second sealing plug with the closure cap can be designed according to an embodiment for a container for a pharmaceutical substance (vial). The closure cap can be a metallic cap, e.g. an aluminium cap. However, it can also be a plastic cap.

The fact that the second sealing plug is connected to the second wall by means of a closure cap means that it can still be reliably retained even if it is relatively large, for example if it takes up the entire projected base area of the second container.

With respect to the second opening in the closure part, it is preferred that this opening occupies only a small cross-sectional area. Further preferably, it occupies only a cross-sectional area corresponding to one tenth or less of the total cross-sectional area at the transition of the first container into the first base. This can be up to one hundredth or less of the cross-sectional area.

It is also preferred that the second opening is circular in a top view. A free opening diameter preferably corresponds to a circular area.

With regard to the method for filling, in a further preferred embodiment, it is provided that the second container is filled before being brought together with the closure part and the first container. The second container can therefore be filled separately and alone.

The filling of the first container by the pressurized medium can be carried out in a room that is pressurized as a whole. Then the closure can also be carried out favourably without pressure loss, for example by means of the—also described—first stopper.

Finally, the second container can also be closed by connecting it to the closure part. In this way, the device as a whole can be completed with the respective filling of the first and second container.

BRIEF DESCRIPTION OF THE DRAWINGS

A further description is given below with reference to the accompanying drawings, which show:

FIG. 4 a representation according to FIG. 2, after rotation into an open position and with partial emptying of the container 1;

FIG. 5 a representation according to FIG. 2 or FIG. 4, after complete emptying of the container 1;

FIG. 6 an individual representation of the closure part;

FIG. 8 a sectional view of the first container, in a ready-to-fill position;

FIG. 10 a continuation of FIG. 9, after the first container has been closed by the closure part;

FIG. 11 a subsequent illustration to FIG. 10 after filling with pressurized gaseous medium and closing the ceiling of the first container;

FIG. 12 an individual representation of the second container, in a ready-to-fill position;

FIG. 13 a representation of the second container after filling with powder;

FIG. 14 a representation according to FIG. 3, whereby the piston is under pressure from a spring;

FIG. 15 a representation according to FIG. 5, whereby the mixed substance is removed from the second container by means of a syringe.

DESCRIPTION OF THE EMBODIMENTS

Figure 1:
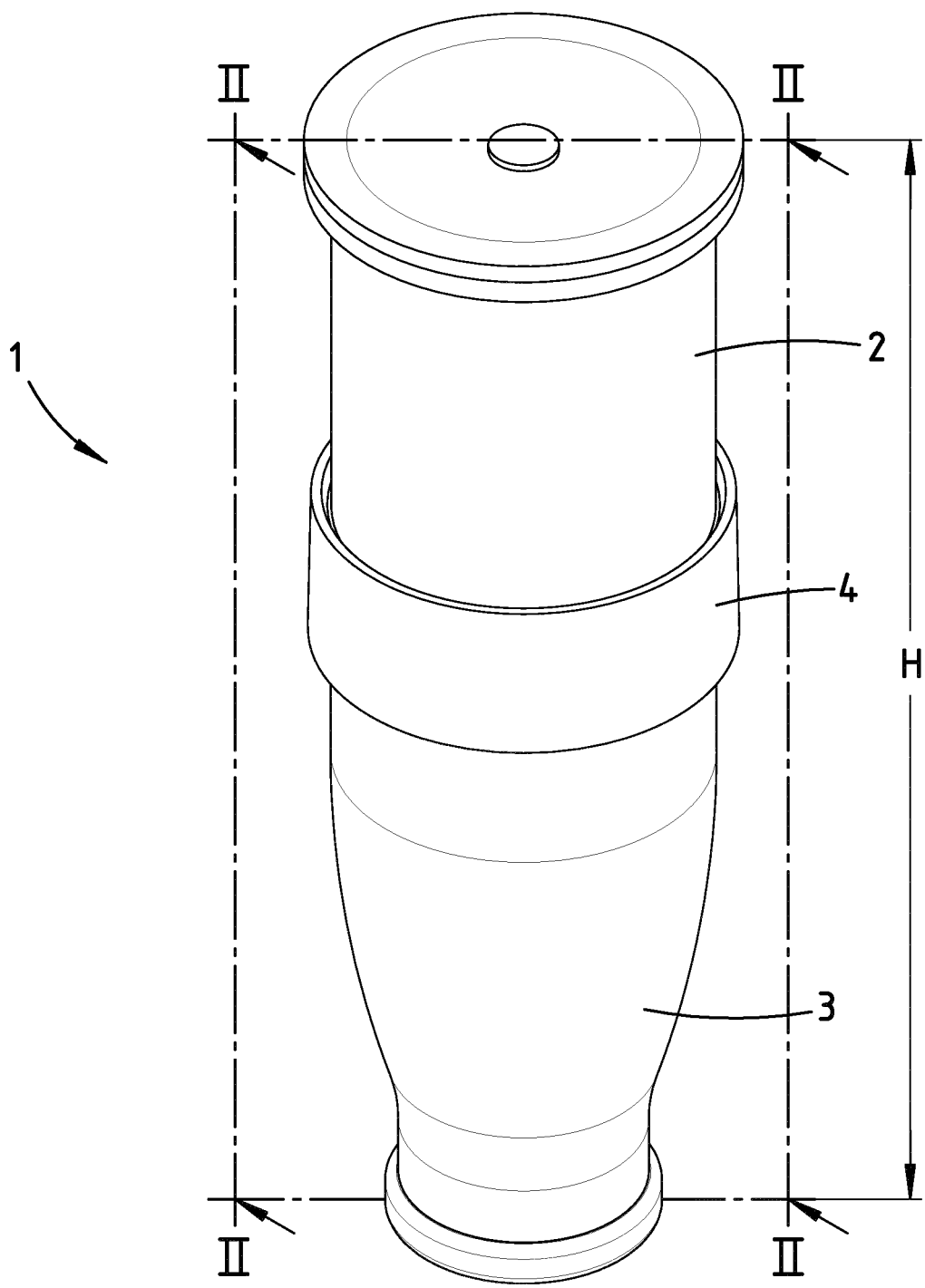
FIG. 1 a perspective view of the device from the outside.

With reference to FIG. 1, a device 1 for preparing and dispensing a mixed substance, starting from a first and a second substance is shown in an external view.

Preferably, the device 1 has an overall height H that corresponds to two hand widths or more, for example. Preferably, the height H will not exceed three or four hand widths.

With reference to the illustration in FIG. 1, the device 1 has a first upper container 2 and a second lower container 3. The first container 2 and the second container 3 are each connected to one, and preferably the same, closure part 4, which thus provides the connection between the first container 2 and the second container 3.

The first container 2 and the second container 3 are held in the closure part 4 so that they can be rotated against each other. For example, a first hand can hold the lower second container 3 and a second hand can hold the upper first container 2. The mixing of the substances can be triggered by rotating them against each other. The closure part 4 may turn together with the second container 3 but there should be a relative motion due to the turning between the first container 2 and the closure part 4. In principal, this can be reached by holding with the hand (also or alone) the closure part 4 when turning the first container 2.

The second container 3, moreover, can preferably be connected to the closure part 4 in such a way that the second container 3 and the closure part 4 cannot rotate relative to each other. This can be achieved, for example, by means of a particularly tight mounting, for example in the snap-in mounting. This can additionally or in the alternative also be achieved by an register protrusion 57 (see e.g. FIG. 12) on a second wall 43, specifically on an extension 28 of the second container 2 which may register with a register exception 58 (see e.g. FIG. 6) on a respective wall section of the closure part 4.

The closure part 4 forms preferably both the closure part 4 for the first container 2 and for the second container 3. In addition, it also forms preferably the connecting part between the first container 2 and the second container 3.

Figure 2:
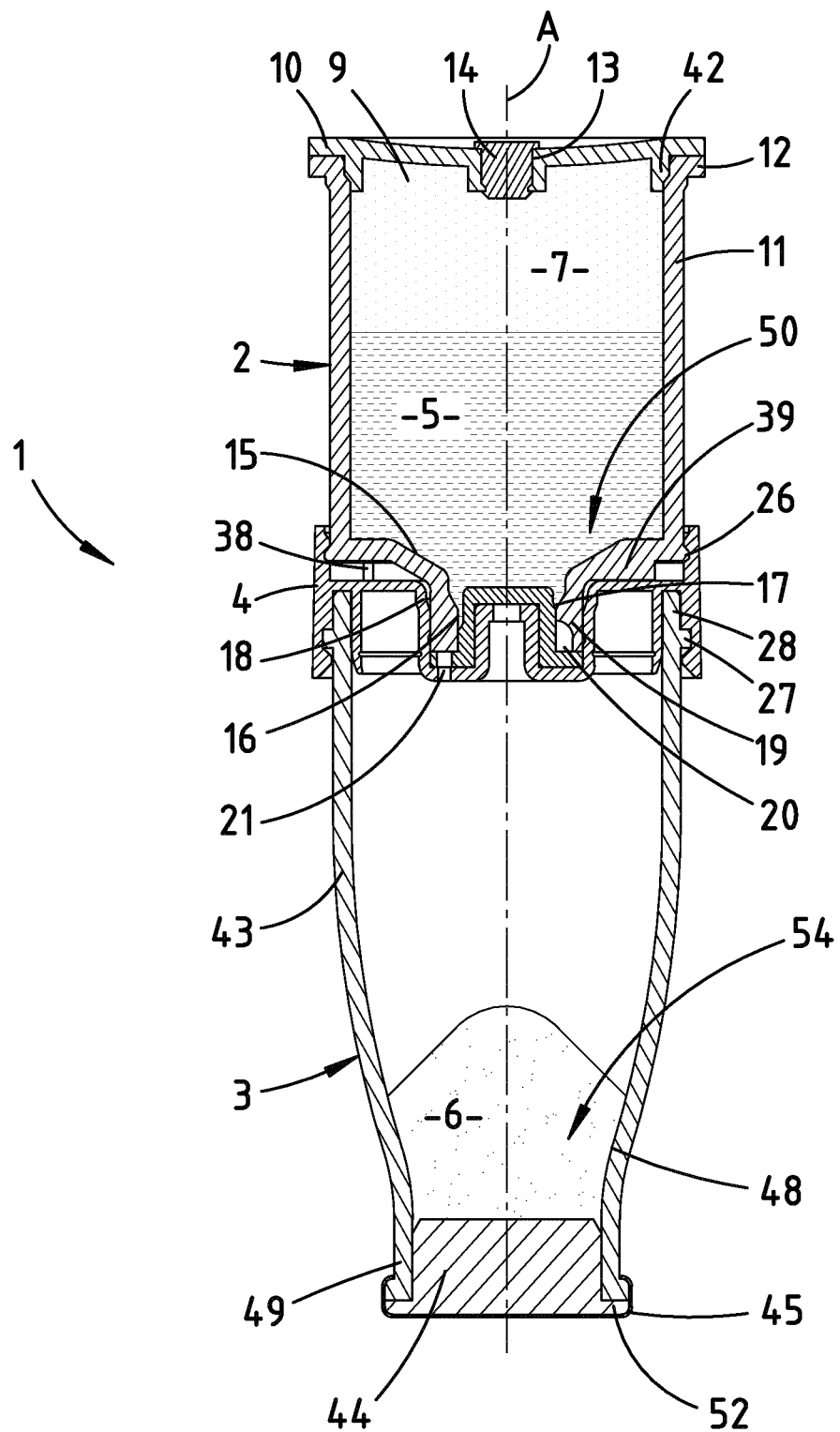
FIG. 2 a sectional view of the device according to FIG. 1, cut of plane II-II.
Figure 3:
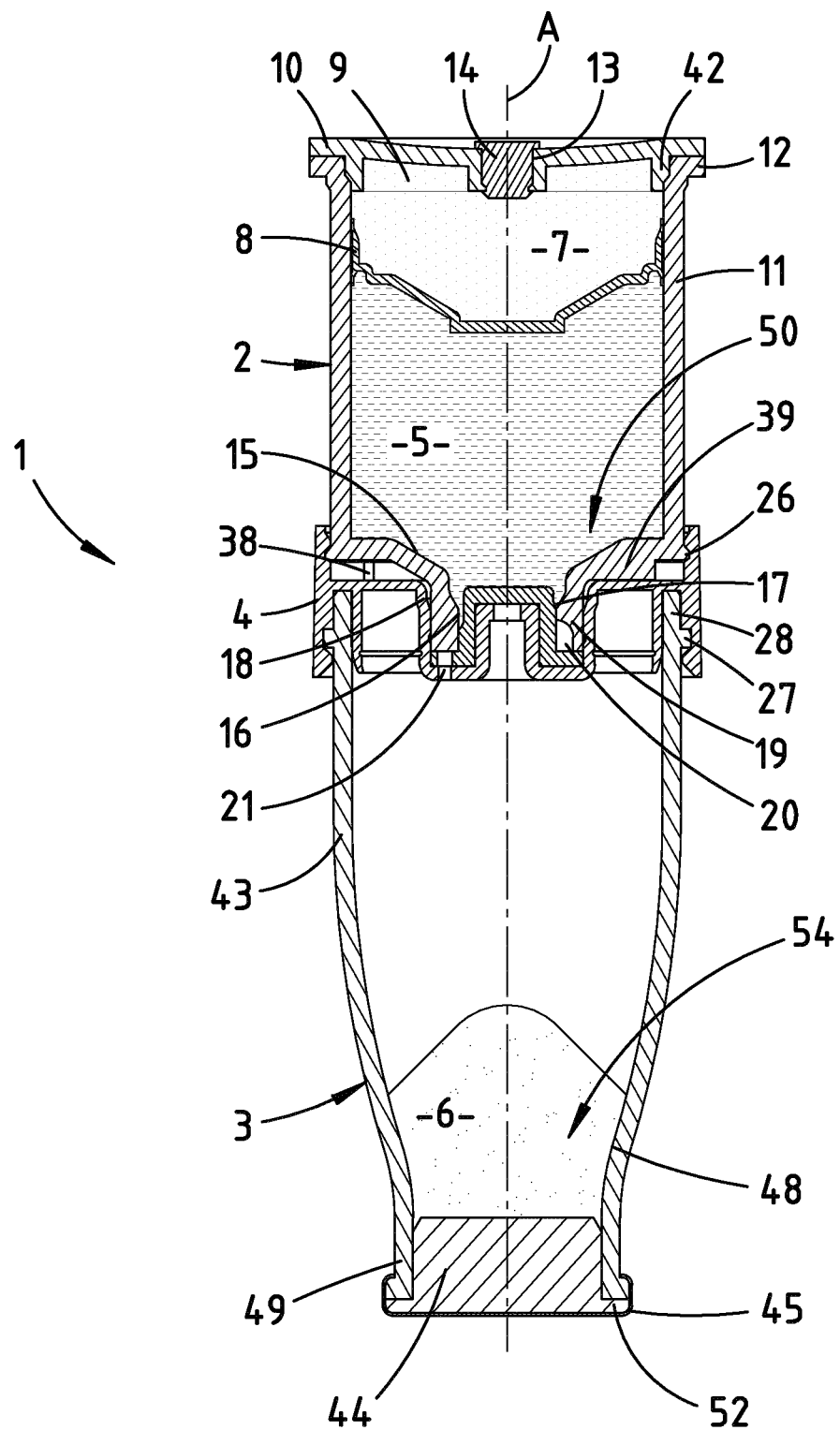
FIG. 3 a representation according to FIG. 2, but with a piston.

FIGS. 2 and 3 show a longitudinal section through the device 1 according to FIG. 1 in two different embodiments.

In the embodiment of FIG. 2, the upper first container 2 is filled with a first substance 5 and the second lower container 3 is filled with a second substance 6. The first substance 5 is further pressurized in the first container 2, preferably and in the embodiment example by a gaseous medium 7 which acts directly on the first substance 5. Here, a pressure of, for example, 4 to 8 bar, further preferably about 6 bar (circa 90 psi) can be specified.

After rotating the first container 2 relative to the second container 3, and/or the closure part 4 respectively, about a central axis A, as explained further below, for example with reference to FIGS. 4 and 5, the first substance 5 can be expelled into the second container 3 by the gaseous medium 7.

The second substance 6 is preferably a powdery substance, while the first substance 5 is preferably a liquid substance. As a result of the expulsion of the first substance 5 into the second container 3, a mixture with the second substance 6 takes place. For example, it can be a powder (second substance) dissolving in the liquid-first-substance.

This results in a mixed substance 23 (see e.g. FIG. 5). The mixing may also be assisted, if necessary, by inverting and/or shaking the device 1. If necessary, before such shaking and/or turning, the sealing state of the first container 2 can also be restored by turning the first container 2 back relative to the second container 3 and/or the closure part 4 respectively. If a pressurized piston 8 is used, see below, this can also as such effectively prevent an undesired backflow of mixed substance into the first container 2.

In the embodiment of FIG. 3, a piston 8 is additionally provided in the first container 2, which in the filling state separates a pressurization chamber 9 from a chamber in the first container 2 receiving the first substance 5. The pressurization chamber 9 is preferably filled by a pressurizing medium, with the gaseous medium 7 already mentioned e.g., which is under pressure, i.e. has a higher pressure than an ambient pressure, for example as indicated above, in the filling state. Thus the pressurization chamber 9 or the pressurized gaseous medium 7 therein exerts a pressure on the piston 8 which, in the opening state according to FIG. 4, moves the piston in the direction of the closure part 4 and thereby expels the first substance 5 located in front of the piston, in its direction of movement, from the first container 2 and conveys it into the second container 3.

Alternatively or additionally, a spring 51, for example a plastic spring or a steel spring, which acts on the piston 8, can be arranged in the pressurization chamber 41, see FIG. 14.

In the embodiment example and preferably, the piston 8 has a contour on the underside which corresponds approximately to the bottom contour of the first container 2. This is a composition of the contour of a first tapered area 15 and the upper end of a sealing projection 17. A complete expulsion of the first substance 5 in the opening state can be favourably supported by this.

The first container 2 has a ceiling 10 which closes the top of the first container. In this case, the spring 51 can be supported on the ceiling 10, as shown in detail in FIG. 14.

Further, in the assembled state shown in FIG. 2 or FIG. 3, the first container 2 has a lower-first-bottom 50 which, in the assembled state shown in FIGS. 2 and 3, for example, is composed of the tapered region 15 and the sealing projection 17.

In the embodiments shown, and preferably, the first container 2 is formed with a predominantly cylindrical first wall 11, which is closed at the top by the ceiling 10, which extends substantially transversely to the central axis A. In the embodiment example and preferably, the ceiling 10 is a separate part which is connected, for example welded, to a flange 12 of the wall 11.

The upper container 2 and/or the closure part 4 and/or the lower container 3 and/or the ceiling 10 and/or the piston 8 are preferably plastic parts, further preferably plastic parts that can be welded together, at least with regard to the upper container 2 and the ceiling 10. For example, they may be PE (polyethylene), PBT (polybutylene terephthalate), PP (polypropylene) or COC (cyclicolefin rubber copolymer). Preferably, the second container can be made of COC. It may also be transparent. The closure part can also be made of rubber or TPE or be formed therewith, preferably in a 2-K process in the case of TPE, with respect to sealing areas. As an alternative to welding, bonding is also possible, for example, or a snap-in or bounce connection that is sufficiently tight. The ceiling can also have a centring edge 42, which can lie against the wall 11 from the inside.

Figure 9:
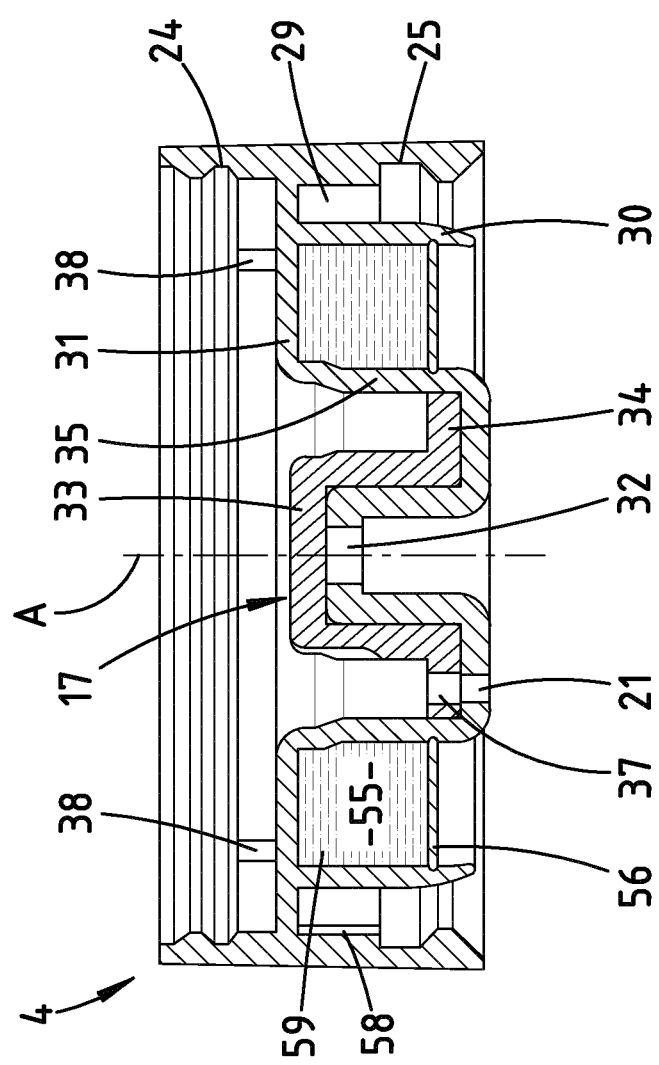
FIG. 9 the first container according to FIG. 1 after filling with a liquid.

A preferably central-first-opening 13 is formed in the ceiling 10, which can be further closed by a first sealing plug 14 and is closed in the embodiment examples shown, with the exception of the states according to FIGS. 8 to 10. The sealing plug 14 can be made of an elastic material, such as rubber, TPE or NBR (Nitrile Butadiene Rubber).

The preferably predominantly cylindrical wall 11 of the first container 2 merges with the closure part 4 at the tapered area 15. The tapered area 15 is preferably formed in one piece with the preferably cylindrical wall 11 of the first container 2, which adjoins it at the top with regard to the illustration in the drawing. The first tapered area 15 preferably forms not an outer surface of the first container 2 in terms that a user touches with a hand on it in the assembled state of the device according e.g. FIG. 2 or FIG. 3. Rather the respective outer surface in this region is given by surface of the closure part 4.

The tapered area 15 is essentially funnel-shaped and ends in a receiving opening 16 being preferably predominantly cylindrical. In the region of the receiving opening 16, the first container 2, with the closure part 4 not yet inserted, has a free inner diameter which preferably corresponds to ½ or less, up to about ¼, preferably about ⅓, of the inner diameter in the cylindrical region above it. The receiving opening 16 is closed in the assembled state according to FIG. 2 or FIG. 3 in the embodiment example and preferably by the further preferably central sealing projection 17 of the closure part 4. The sealing projection 17 of the closure part 4, together with a wall section 18 extending radially outwardly at a distance therefrom and substantially in alignment with the central axis A, forms a receiving groove for an end region 19 of the tapered area 15 of the first container 2. The end region 19 is the part being preferably predominantly cylindrical. The end region 19 can be received in a sealing manner in the receiving groove. The end region 19 is provided with an outlet formation 20 which, by the aforementioned rotating of the first container 2 relative to the second container 3, wherein the closure part 4 is preferably connected to the second container 3 in a rotationally fixed manner, can be brought into alignment with a-second-opening 21 in the closure part 4, after which the first substance 5 can emerge from the first container 2 into the second container 3.

In FIG. 4 the device 1 is shown after a rotation of the first container 2 relative to the closure part 4 or, as preferred, at the same time also to the second container 3, up to a position in which the outlet formation 20 is rotated in alignment with the—second—opening 21. The first substance 5 thus enters the second container 3 from the first container 2, preferably forming a spray jet 22, and mixes there with the second substance 6.

The cross-sectional area of the second opening 21 is about one tenth or less of the total cross-sectional area at the transition of the first container into the first bottom 50, i.e. in the embodiment example preferably in the region of the cylindrical wall of the first container 2. This may be up to one hundredth or less of this cross-sectional area.

A free opening diameter of the second opening 21 preferably corresponds to a circular area.

FIG. 5 shows the same position of the containers 2, 3 of the device 1 as in FIG. 4. The first substance 5 has completely passed into the second container 3. The result is a mixed substance 23. In FIGS. 4 and 5, as in FIG. 2, the piston 8 can also be omitted and only the medium 7 is present.

FIG. 6 shows another enlarged view of the closure part 4. The closure part 4, is basically build with several circumferentially running structures, starting with an outer band-like wall part running essentially in cross section in the direction of the axis A, followed by a first inner wall part, running essentially in cross direction to the axis A, and further followed by an inner circular section, making up for the sealing projection 17. This first inner wall part and the sealing projection 17 are spaced a part to each other by a circumferentially running groove, making up for the receiving groove 29 further described below.

The closure part 4 further has an upper snap-in receptacle 24, and/or, more preferably, a lower snap-in receptacle 25 for the first container 2 or the second container 3. The snap-in receptacles 24, 25 are each formed as circumferential grooves formed over 360 degrees. In the assembled state of the device, a snap-in projection 26 of the first container 2, which preferably runs circumferentially in the same manner, is accommodated in the first snap-in receptacle 24. The snap-in projection 26 is preferably formed at a transition of the wall 11 into the tapered area 15 of the base of the first container 2. Further preferably, it projects outwardly beyond an outer surface of the preferably cylindrical wall 11.

The lower snap-in receptacle 25 serves to receive a second snap-in projection 27 of the lower, second container 3, which is preferably identical in terms of radial and circumferential extension. The snap-in projection 27 projects radially beyond an outer surface of the wall region 43 of the lower, second container 3, which is also preferably cylindrical in this region. In the direction of the first container 2, the wall of the second container 3 still preferably continues cylindrically as an extension 28 beyond the second snap-in projection 27. Preferably at the extension 28, the register protrusion 57 (e.g. FIG. 12), which can be a rib extending in the direction of the central axis A, is provided for. The closure part 4 has for receiving the register protrusion 57 the register exception 58.

FIG. 6 also shows as an example, it can also be provided in all embodiments shown, that a chamber 55 is formed in the closure part 4, in which an auxiliary substance 59, preferably for example a hygroscopic material (desiccant) is accommodated. The chamber 55 can be formed by the partition wall 31, if necessary also in cooperation with the sealing lip 30, preferably as a circumferential annular chamber, it may, e.g. in this case, be closed at the bottom by a closing part 56. The partition wall 31 does provide a closure, preferably complete air tight closure, of the chamber 55 with the respect to the container 2. The closing part 56 can also be a foil which is connected, for example glued or welded, to the partition wall 31 and/or the sealing lip 30 in the lower region. The closing part 56 is further preferably formed to be permeable to air, in order to be able to extract moisture from the second container 3 if necessary. In this respect, the closing part 56 can also be formed as an air-permeable fleece or the like. The closing part 56 may have a rigid frame part by which it is glued, welded or snap-fitted or similar to the partition wall 31 and/or the sealing lip 30.

In particular, in the event that the second container 3 is filled with a powdery substance, a desirable keeping dry of the substance until the mixture takes place can be favourably achieved.

The lower container 3 also has—see e.g. FIG. 2—a second tapered area 48 adjacent to a second cylindrical wall 43, which in the embodiment and preferably merges into a cylindrical end area 49. The second tapered area 48 also preferably forms a tapered outer surface of the second container 3. This can be further advantageous with regard to handling the device 1. A free inner diameter of the second tapered area 48, at its end, in the given case of the cylindrical end area 49, preferably corresponds to about ⅔ to ¼, further preferably about half of the inner diameter in the cylindrical region of the second wall 43 adjoining the closure part 4.

A receiving groove 29 (compare in particular FIG. 6) is formed in the closure part 4 for the extension 28 of the second wall 43 of the second container 3. The receiving groove 29 is preferably delimited radially inwards by the circumferential sealing lip 30. The sealing lip 30 is preferably tapered like a lip at its free end. The receiving groove has preferably at a specific circumferential location the register exception 58.

The closure part 4 further has the partition wall 31 that substantially completely closes the cross-section. The partition wall 31 is preferably only interrupted by the second opening 21. In the embodiment example and preferably, the partition wall 31 has a further blind opening 32. However, in the embodiment example and preferably, this partition 31 and in the given case the blind opening 32 is covered by a cover 33. The overlapping is constantly given. The blind opening 32 thus preferably does not form a passage in any state of use, at least not from the first container 2 into the second container 3. However, it can be advantageous for manufacturing. For example, for injection of the cover 33, for example when using a two-component injection process, for which purpose this opening can be used for an injection nozzle which—with reference to the illustration in FIG. 6—enables injection of the cover 33 from below through this opening. The blind opening 32 may also be advantageous with regard to filling. If substance is introduced under pressure through the blind opening 32, the cover 33 can be advantageously flowed through in the sense of a non-return valve if the cover 33 has a correspondingly flexible design and is not, at least not completely, fixed to the partition 31.

The partition wall 31 preferably runs at several angles in cross-section. Starting from a wall section running at the edge transversely to the central axis A, it bends at a first angle in a direction corresponding to the central axis, in the embodiment example preferably in the direction of the second container 3, to form a radially outer boundary of the receiving groove. The sealing lip 30 is preferably also formed-projecting downwards-on the wall section running at the edge transversely to the central axis A. The partition wall 31 then runs again approximately at a right angle to the central axis A to form a bottom of the receiving groove. It then angles away again in the opposite direction to the first angle for a further run in the direction of the central axis A, in order to then run again transversely to the central axis A again to form the sealing projection 17. The partition wall 31 is preferably formed rotationally symmetrically to the central axis A, with the exception of approximately the second opening 21.

The cross-section of the cover 33 is preferably hat-shaped. It has a central U-shaped part which forms the sealing projection 17. Furthermore, a flat area 34 is formed, which covers a bottom of an annular space 36 formed between the sealing projection 17 and an adjacent wall area 35 of the partition 31 running essentially in the direction of the central axis A. The radially outer boundary of the receiving groove as well as the radially outward remaining part of the partition 31, is preferably not covered by the cover 33.

The cover 33 is preferably made of an elastic material, such as rubber or TPE. The cover may be at least in part, build by two component molding or may be made separately and snap or pressed fitted with the formation of the partition making up for the sealing projection 17. The cover 33 is not turnable combined with the partition 31.

In the assembled state as shown in FIG. 3, the first end region 19 of the first wall 11 of the first container 2 is accommodated in the annular space 36. As a result of, for example, a certain oversize towards the centre, a sealing closure to the cover 33 is provided.

The cover 33, preferably in its flat area 34, also has a through opening 37, which is preferably permanently aligned with the second opening 21.

In the closed state, the outlet formation 20 in the end region 19 is in a rotated position relative to the opening 21, as can also be seen from FIG. 2 or 3. Preferably, the rotated position is at about 180 degrees to a preferred initial factory-defined closure position.

In the open state, such as shown in FIG. 4, the outlet formation 20 is in alignment with the opening 21 and, of course, the through opening 37.

Further preferably, one or two stops 38 are formed on the closure part 4, on the side of the partition wall 31 facing the first container 2. Through this, in cooperation with a corresponding stop formation 39 on the first container 2, the rotated position can be determined according to the opening position or the closure position.

Like the first sealing plug 14, the second sealing plug 44 can be made of an elastic material, for example rubber or TPE.

Figure 7:
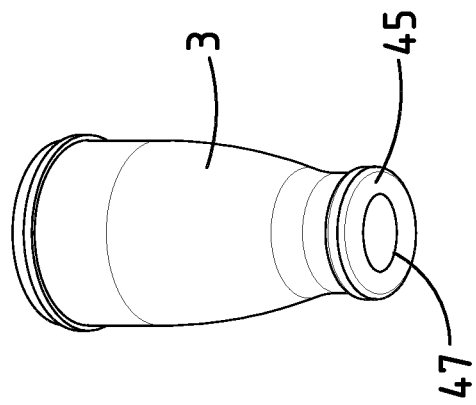
FIG. 7 a perspective view from below of the second container.

With reference to FIG. 7, it can be seen that the second container 3 is closed with the second sealing plug 44. The second closure plug 44 is secured in the closed position by a closure cap 45 which, for example, engages over an undergrip edge 46 (see e.g. FIG. 13) at a lower free end of the wall of the second container 3.

The first and second containers are arranged one behind the other along the central axis A. Preferably, the first and second containers are each formed rotationally symmetrical to the central axis A. The first wall 11 and also the second wall 43 are provided circumferentially to the central axis A.

The second sealing plug 44 also forms the—second—bottom 54 of the container 3 together with the second tapered area 48, if provided.

As can be seen in particular from FIG. 7, the closure cap 45 can have an opening 47 in which the second closure plug 44 is exposed. In particular, this can be a design such as is known from medicine vials. The closure cap 45 can be a so-called crimp cap, for example made of aluminium. However, it may also be a plastic cap which is, for example, bounced up onto the associated end region of the second wall 43. The second sealing plug 44 can be pierced through the opening 47, for example with a syringe 53, in order to provide the third opening, and the mixed substance can then be withdrawn via the syringe (compare also FIG. 15).

With reference to FIGS. 8 to 11, the filling of the first container 2 is described.

In the case of the design with the piston 8, the container 2 is first set up so that the piston 8 is arranged on the ceiling side and preferably the first opening 13 is not yet closed by the first sealing plug 14. In this case, the container 2 is suitably positioned with the receiving opening 16 facing upwards. The first substance 5, which is preferably a liquid, is then filled into the first container 2 through the exposed receiving opening 16, FIG. 9. Then, FIG. 10, the closure part 4 is placed on, for example pressed on, so that the connection, preferably the locking, is given. The closure part 4 is placed in such an orientation that the second opening 21 is closed.

Then, in the embodiment example, gaseous medium 7, which is preferably under pressure, is filled through the opening 13 into the area on the side of the piston 8 facing away from the first substance 5 and, after filling, the first sealing plug 14 is inserted. In the event that no piston is provided, the first sealing plug 14 is suitably first brought into a preferably provisional sealing position when filling the first container 2 with the preferably liquid substance. After completion of the filling of the first container 2 and closing with the closure part 4 as shown in FIG. 10, the container 2 is then suitably turned over so that it can stand up on the closure part 4, for example. The first sealing plug 14 is removed again and then the pressurized gaseous medium 7 is introduced, after which the first sealing plug 14 is then moved into its final sealing position.

The first sealing plug 14 is obviously formed with a first flange portion 40 which can limit the insertion of the sealing plug 14. Furthermore, a tapered projection 41 is formed in the opening 13, which is passed over by the associated end of the first sealing plug 14 during insertion. In this case, the deformation of the stopper as shown in FIG. 11, which at the same time leads to a removal security, can occur solely due to the elasticity of the first stopper 14. However, it can also be based on a corresponding deformation in the first sealing plug 14. In a provisional closure position, the tapered projection 41 may, for example, not yet be overrun by the first closure plug 14.

The second sealing plug 44 also preferably has a-second-flange section 52 (see e.g. FIG. 2).

With reference to FIGS. 12 and 13, the filling of the second container 3 is illustrated.

According to FIG. 12, the second container 3 is set up like a normal cup and then the second substance 6, preferably a powder, is filled in from above through the free opening. The second bottom 54 of the second container 3 is already formed by the second sealing plug 44. The combination of the first container 2 and the closure part 4 is then placed on the second container 3 and the second container 3 and the closure part 4 are—also—locked together in a corresponding manner.

With reference to FIG. 14, an embodiment is shown in which a spring 51 acts on the piston 8. This can be a steel spring or a plastic spring. In this case, a pressurized medium 7 can also be provided in the pressurization chamber 9. However, the pressurized medium 7 can also be dispensed with completely, so that in this case only air under ambient pressure is present in the pressurization chamber 9.

With reference to FIG. 15, it is shown how the mixed substance 23 can be removed from the second container, for example with a syringe 53, by piercing the second closure plug 44.

| List of reference signs | |
|---|---|
| 1 | device |
| 2 | first container |
| 3 | second container |
| 4 | closure part |
| 5 | first substance |
| 6 | second substance |
| 7 | gaseous medium |
| 8 | piston |
| 9 | pressurization chamber |
| 10 | ceiling |
| 11 | first wall |
| 12 | flange |
| 13 | first opening |
| 14 | sealing plug, first |
| 15 | first tapered area |
| 16 | receiving opening |
| 17 | sealing projection |
| 18 | wall section |
| 19 | end region |
| 20 | outlet formation |

-continued

| List of reference signs | |
|---|---|
| 21 | second opening |
| 22 | spray jet |
| 23 | mixed substance |
| 24 | upper snap-in receptacle |
| 25 | lower snap-in receptacle |
| 26 | snap-in projection, first |
| 27 | second snap-in projection |
| 28 | extension |
| 29 | receiving groove |
| 30 | sealing lip |
| 31 | partition wall |
| 32 | blind opening |
| 33 | cover |
| 34 | flat area |
| 35 | wall area |
| 36 | annular space |
| 37 | through opening |
| 38 | stop |
| 39 | stop shaping |
| 40 | first flange partition |
| 41 | tapered projection |
| 42 | centering edge |
| 43 | second wall |
| 44 | second sealing plug |
| 45 | closure cap |
| 46 | undergrip edge |
| 47 | opening |
| 48 | second tapered area |
| 49 | cylindrical end area |
| 50 | first bottom |
| 51 | spring |
| 52 | second flange section |
| 53 | syringe |
| 54 | second bottom |
| 55 | chamber |
| 56 | closing part |
| 57 | register protrusion |
| 58 | register exception |
| 59 | auxiliary substance |
| A | central axis |
| H | overall height |

The invention claimed is:

1. A device (1) for preparing and dispensing a mixed substance (23) starting from a first substance (5) and a second substance (6), comprising a first container (2) containing the first substance (5) and a second container (3) containing the second substance (6), the first container (2) and the second container (3) having a common central axis (A) and being arranged one behind the other along the axis (A), the first container (2) having a ceiling (10) with a first opening (13), a first wall (11) extending substantially perpendicularly to the ceiling (10) and extending around the axis, and a first bottom (50), the second container (3) having a second wall (43) extending around the axis (A) and a second bottom (54), the first bottom (50) having an outlet formation (20) which is configured to be closed by a closure part (4), the closure part (4) also forming a lid for the second container (3) by connection to a free edge of the second wall, wherein the outlet formation (20) is configured to be brought into alignment with a second opening (21) in the closure part (4) by rotating the first container (2) relative to the closure part (4), the alignment clearing the way for the first substance (5) into the second container (3), for producing the mixed substance (23) in the second container (3), wherein the ceiling (10) and the second bottom (54) form opposite ends of the device (1), wherein a third opening is formed in the second bottom, and wherein the mixed substance (23) is removable from the device (1) through the third opening, wherein the ceiling has a first sealing plug (14) configured for closing the first opening (13) and which is removable from the first opening, wherein the second bottom (54) comprises a second sealing plug (44), and wherein the second sealing plug is connected to the second wall by a closure cap (45).

2. The device according to claim 1, (1) wherein the first container (2) and the second container (3) are configured to be moved from a closed position in which the first substance (5) cannot escape from the first container (2) into an open position in which the first substance (5) can enter the second container (3), wherein the first substance (2) is acted upon by a piston (8) accommodated in the first container (2).

3. The device (1) according to claim 2, wherein the first bottom (50) has a receiving opening (16).

4. The device (1) according to claim 1, wherein the first container (2) and the second container (3) are connected to each other via the closure part (4).

5. The device (1) according to claim 1, wherein the outlet formation (20) can be brought into alignment with the second opening (21) by merely rotating the first container (2) about the central axis, without moving the first container (2) in the direction of the central axis A.

6. The device (1) according to claim 4, wherein the closure part (4) has an upper snap-in receptacle (24) for the first container (2) and a lower snap-in receptacle (25) for the second container (3), the upper and lower receptacles being spaced apart in the direction of the central axis A.

7. The device (1) according to claim 6, wherein the upper and lower receptacles only allow rotation of the first and second containers respectively about the central axis A, but do not allow movement of the first or second container in a longitudinal direction with respect to the central axis.

8. The device (1) according to claim 1, wherein the second opening (21) is formed with a right angle distance to the central axis A.

9. The device (1) according to claim 1, wherein the second opening (21) occupies one tenth or less of cross-sectional area of the first container (2) at the transition into the first bottom (50), up to one hundredth.

10. The device (1) according to claim 1, wherein the second opening (21) is formed in a circular shape.

* * * * *